United States Patent
Yang et al.

(10) Patent No.: US 10,930,010 B2
(45) Date of Patent: Feb. 23, 2021

(54) METHOD AND APPARATUS FOR DETECTING LIVING BODY, SYSTEM, ELECTRONIC DEVICE, AND STORAGE MEDIUM

(71) Applicant: BEIJING SENSETIME TECHNOLOGY DEVELOPMENT CO., LTD, Beijing (CN)

(72) Inventors: Kai Yang, Beijing (CN); Tianpeng Bao, Beijing (CN); Rui Zhang, Beijing (CN); Liwei Wu, Beijing (CN)

(73) Assignee: BEIJING SENSETIME TECHNOLOGY DEVELOPMENT CO., LTD, Beijing (CN)

(*) Notice: Subject to any disclaimer, the term of this patent is extended or adjusted under 35 U.S.C. 154(b) by 130 days.

(21) Appl. No.: 16/234,434

(22) Filed: Dec. 27, 2018

(65) Prior Publication Data

US 2019/0347823 A1    Nov. 14, 2019

Related U.S. Application Data

(63) Continuation of application No. PCT/CN2018/115499, filed on Nov. 14, 2018.

(30) Foreign Application Priority Data

May 10, 2018    (CN) .......................... 201810444105.4

(51) Int. Cl.
*G06K 9/00* (2006.01)
*G06T 7/73* (2017.01)
*G06T 7/50* (2017.01)

(52) U.S. Cl.
CPC ............... *G06T 7/73* (2017.01); *G06T 7/50* (2017.01); *G06T 2207/30196* (2013.01)

(58) Field of Classification Search
CPC . G06T 2207/10024; G06T 2207/10028; G06T 7/521; G06T 2207/10048;
(Continued)

(56) References Cited

U.S. PATENT DOCUMENTS 10,453,249 B2 * 10/2019 Smirnov ................. G06T 7/557
2017/0345146 A1 * 11/2017 Fan ..................... G06K 9/00228
(Continued)

FOREIGN PATENT DOCUMENTS

| CN | 105956518 A | 9/2016 |
|---|---|---|
| CN | 105956572 A | 9/2016 |

(Continued)

OTHER PUBLICATIONS

Sze, Vivienne, et al. "Efficient processing of deep neural networks: A tutorial and survey." Proceedings of the IEEE 105.12 (2017): 2295-2329. (Year: 2017).*
(Continued)

*Primary Examiner* — Li Liu
(74) *Attorney, Agent, or Firm* — Syncoda LLC; Feng Ma

(57) ABSTRACT

A method for detecting a living body includes: acquiring depth information of a target object sensed by a first sensor and a target image sensed by a second sensor; performing key point detection on the target image to obtain key point information of the target object; and obtaining a living body detection result of the target object based on the depth information of the target object and the key point information of the target object.

18 Claims, 13 Drawing Sheets

(58) Field of Classification Search
CPC .......... G06T 7/593; G06T 2207/30201; G06T 2207/30196; G06K 9/00255; G06K 9/00288; G06K 9/00248; G06K 9/00906
See application file for complete search history.

(56) References Cited

U.S. PATENT DOCUMENTS

| | | | | |
|---|---|---|---|---|
| 2018/0096196 | A1* | 4/2018 | Gordon | G06T 7/20 |
| 2018/0173979 | A1* | 6/2018 | Fan | G06T 9/2036 |
| 2019/0034702 | A1* | 1/2019 | Hong | G06K 9/00255 |
| 2019/0034709 | A1* | 1/2019 | Qiu | G06N 3/08 |
| 2019/0147676 | A1* | 5/2019 | Madzhunkov | G06T 7/20 340/5.2 |
| 2019/0304113 | A1* | 10/2019 | Huang | G06T 5/001 |
| 2019/0311496 | A1* | 10/2019 | Bloom | G06T 7/33 |
| 2020/0167581 | A1* | 5/2020 | Zhang | G06K 9/0061 |

FOREIGN PATENT DOCUMENTS

| | | |
|---|---|---|
| CN | 107368778 A | 11/2017 |
| CN | 107590430 A | 1/2018 |
| CN | 108764069 A | 11/2018 |
| JP | 2013156680 A | 8/2013 |
| JP | 2015082247 A | 4/2015 |
| KR | 20110080327 A | 7/2011 |
| KR | 20140053647 A | 5/2014 |
| KR | 20170000748 A | 1/2017 |
| WO | 2018079031 A1 | 5/2018 |

OTHER PUBLICATIONS

First Office Action of the Chinese application No. 201810444105.4, dated Mar. 5, 2020.
International Search Report in the international application No. PCT/CN2018/115499, dated Jan. 30, 2019.
Supplementary European Search Report in the European application No. 18839510.7, dated Oct. 11, 2019.
Wang Yan et al: "Robust face anti-spoofing with depth information", Journal of Visual Communication and Imagerepresentation, vol. 49, Nov. 1, 2017 (Nov. 1, 2017), pp. 332-337, XP085260378, ISSN: 1047-3203, DOI: 10.1016/J.JVCIR.2017.09.002 * section 3; figure 4 *.
Xi Meng et al: "Local binary pattern network: A deep learning approach for face recognition", 2016 IEEE International Conference on Image Processing (ICIP), IEEE, Sep. 25, 2016 (Sep. 25, 2016), pp. 3224-3228, XP033017104, DOI: 10.1109/ICIP.2016. 7532955 [retrieved on Aug. 3, 2016] * the whole document *.
Cui Jiyun et al: "Improving 2D Face Recognition via Discriminative Face Depth Estimation", 2018 International Conference on Biometrics (ICB), IEEE, Feb. 20, 2018 (Feb. 20, 2018), pp. 140-147, XP033374959, DOI: 10.1109/ICB2018.2018.00031 [retrieved on Jul. 13, 2018] * p. 143, right column *.
Lv Xiong et al: "Combining heterogenous features for 3D hand-held object recognition", Visual Communications and Image Processing; Jan. 20, 2004-Jan. 20, 2004; Sanjose,, vol. 9273, Oct. 29, 2014 (Oct. 29, 2014), pp. 927321-927321, XP060043385, DOI: 101117/12. 2071381 ISBN: 978-1-62841-730-2 * section 3; figure 1 *.
Tian Qianyu et al: "Three-dimensional fingerprint recognition by using convolution neural network", Proceedings of SPIE; [Proceedings of SPIE ISSN 0277-786X vol. 10524], SPIE, US, vol. 10621, Jan. 12, 2018 (Jan. 12, 2018), pp. 1062101-1062101, XP060099061, DOI: 101117/12.2294017 ISBN: 378-1-5106-1533-5 * section 3.3; figure 3 *.
Research on Personification Presentation by Automatic Facial Parts Detection, SIG Technical Report (Jan. 12, 2017) vol. 2017-CVIM-205 No. 39, p. 1-7.
First Office Action of the Korean application No. 10-2019-7019442, dated Jul. 1, 2020.
First Office Action of the Japanese application No. 2019-515661, dated Jul. 7, 2020.
Second Office Action of the Japanese application No. 2019-515661, dated Dec. 1, 2020.

* cited by examiner

METHOD AND APPARATUS FOR DETECTING LIVING BODY, SYSTEM, ELECTRONIC DEVICE, AND STORAGE MEDIUM

CROSS-REFERENCE TO RELATED APPLICATIONS

This is a continuation application of International Patent Application No. PCT/CN2018/115499, filed on Nov. 14, 2018, which claims priority to the Chinese Patent Application No. 201810444105.4 filed on May 10, 2018. The disclosures of these applications are hereby incorporated by reference in their entirety.

TECHNICAL FIELD

This disclosure relates to the field of computer vision technologies, and in particular, to a method and an apparatus for detecting a living body, a system, an electronic device, and a storage medium.

BACKGROUND

At present, face recognition technology is widely used in face unlocking, face payment, unmanned supermarkets, video surveillance, and other scenarios. However, in face recognition technology, there are risks of being easily hacked by a fake face in the form of a physical face photo, a digital face photo, a video including a face, etc. Therefore, a detection for a living body is a necessary part in face recognition.

SUMMARY

In this regard, embodiments of this disclosure provide a method and an apparatus for detecting a living body.

A method for detecting a living body provided according to an aspect of the embodiments of this disclosure includes: acquiring depth information of a target object sensed by a first sensor and a target image sensed by a second sensor; performing key point detection on the target image to obtain key point information of the target object; and obtaining a living body detection result of the target object based on the depth information of the target object and the key point information of the target object.

In some embodiments, the target object is a face.

In some embodiments, the second sensor is an image sensor. For example, the second sensor is an RGB (Red, Green, and Blue) sensor or a near-infrared sensor.

In some embodiments, the first sensor is a depth sensor. For example, the first sensor is a Time of Flight (ToF) sensor or a structured light sensor.

In some embodiments, the first sensor and the second sensor are integrated in one device, for example, integrated in a 3D camera.

In some embodiments, before performing key point detection on the target image, the method further includes: aligning the depth information of the target object with the target image according to a parameter of the first sensor and a parameter of the second sensor.

In some embodiments, the obtaining a living body detection result of the target object based on the depth information of the target object and the key point information of the target object includes:

obtaining first feature information based on the depth information of the target object and the key point information of the target object;

obtaining second feature information based on the key point information of the target object; and determining a living body detection result of the target object based on the first feature information and the second feature information.

In some embodiments, the obtaining first feature information based on the depth information of the target object and the key point information of the target object includes: inputting the depth information of the target object and the key point information of the target object into a first neural network for processing to obtain first feature information; and the obtaining second feature information based on the key point information of the target object includes: inputting the target image and the key point information of the target object into a second neural network for processing to obtain second feature information.

In some embodiments, the first neural network and the second neural network have the same network structure.

In some embodiments, the obtaining first feature information based on the depth information of the target object and the key point information of the target object includes: convoluting the depth information of the target object and the key point information of the target object to obtain a first convolution result; down-sampling the first convolution result to obtain a first down-sampling result; and obtaining first feature information based on the first down-sampling result.

In some embodiments, the obtaining second feature information based on the key point information of the target object includes:

convoluting the target image and the key point information of the target object to obtain a second convolution result;

down-sampling the second convolution result to obtain a second down-sampling result; and obtaining second feature information based on the second down-sampling result.

In some embodiments, the determining a living body detection result of the target object based on the first feature information and the second feature information includes: performing fusion processing on the first feature information and the second feature information to obtain third feature information; and determining a living body detection result of the target object according to the third feature information.

In some embodiments, the determining a living body detection result according to the third feature information includes:

obtaining a probability that the target object is a living body based on the third feature information; and determining a living body detection result of the target object according to the probability that the target object is a living body.

An apparatus for detecting a living body provided according to another aspect of the embodiments of this disclosure includes:

a processor; and a memory for storing instructions executable by the processor;

wherein execution of the instructions by the processor causes the processor to perform:

acquiring depth information of a target object sensed by a first sensor and a target image sensed by a second sensor;

performing key point detection on the target image to obtain key point information of the target object; and obtaining a living body detection result of the target object based on the depth information of the target object and the key point information of the target object.

In some embodiments, the target object is a face.

In some embodiments, the second sensor is an image sensor. For example, the second sensor is an RGB sensor or a near-infrared sensor.

In some embodiments, the first sensor is a depth sensor. For example, the first sensor is a ToF sensor or a structured light sensor.

In some embodiments, the first sensor and the second sensor are integrated in one device, for example, integrated in a 3D camera.

In some embodiments, before the operation of performing key point detection on the target image, the operations further include: aligning the depth information of the target object with the target image according to a parameter of the first sensor and a parameter of the second sensor.

In some embodiments, the operation of obtaining a living body detection result of the target object based on the depth information of the target object and the key point information of the target object includes: obtaining first feature information based on the depth information of the target object and the key point information of the target object; obtaining second feature information based on the key point information of the target object; and determining a living body detection result of the target object based on the first feature information and the second feature information.

In some embodiments, the operation of obtaining first feature information based on the depth information of the target object and the key point information of the target object includes: inputting the depth information of the target object and the key point information of the target object into a first neural network for processing to obtain first feature information; and the operation of obtaining second feature information based on the key point information of the target object includes: inputting the target image and the key point information of the target object into a second neural network for processing to obtain second feature information.

In some embodiments, the first neural network and the second neural network have the same network structure.

In some embodiments, the operation of obtaining first feature information based on the depth information of the target object and the key point information of the target object includes: convoluting the depth information of the target object and the key point information of the target object to obtain a first convolution result; down-sampling the first convolution result to obtain a first down-sampling result; and obtaining first feature information based on the first down-sampling result.

In some embodiments, the operation of obtaining second feature information based on the key point information of the target object includes: convoluting the target image and the key point information of the target object to obtain a second convolution result; down-sampling the second convolution result to obtain a second down-sampling result; and obtaining second feature information based on the second down-sampling result.

In some embodiments, the operation of determining a living body detection result of the target object based on the first feature information and the second feature information includes: performing fusion processing on the first feature information and the second feature information to obtain third feature information; and determining a living body detection result of the target object according to the third feature information.

In some embodiments, the operation of determining a living body detection result according to the third feature information includes: obtaining a probability that the target object is a living body based on the third feature information; and determining a living body detection result of the target object according to the probability that the target object is a living body.

The apparatus for detecting a living body provided by the embodiments of this disclosure is configured to execute the method for detecting a living body in any of the foregoing embodiments, and includes modules and units configured to execute steps and/or procedures of any of the foregoing possible method for detecting a living body.

A non-transitory computer-readable storage medium provided according to another aspect of the embodiments of this disclosure has a computer program instruction stored thereon, wherein execution of the instructions by the processor causes the processor to implement the method above.

A system for detecting a living body provided according to another aspect of the embodiments of this disclosure includes: the foregoing apparatus for detecting a living body, a first sensor, and a second sensor.

A system for detecting a living body provided according to another aspect of the embodiments of this disclosure includes: the foregoing non-transitory computer-readable storage medium, a first sensor, and a second sensor.

An electronic device provided according to another aspect of the embodiments of this disclosure includes:

a first sensor, configured to detect depth information of a target object;

a second sensor, configured to collect a target image including the target object; and a processor, configured to perform key point detection on the target image collected by the second sensor to obtain key point information of the target object, and obtain a living body detection result of the target object based on the depth information of the target object detected by the first sensor and the key point information of the target object.

In some embodiments, the second sensor is an RGB sensor or a near-infrared sensor.

In some embodiments, the first sensor is a ToF sensor or a structured light sensor.

In some embodiments, the processor is further configured to align the depth information of the target object with the target image according to a parameter of the first sensor and a parameter of the second sensor.

In some embodiments, the processor is configured to: obtain first feature information based on the depth information of the target object and the key point information of the target object; obtain second feature information based on the key point information of the target object; and determine a living body detection result of the target object based on the first feature information and the second feature information.

In some embodiments, the processor is configured to: input the depth information of the target object and the key point information of the target object into a first neural network for processing to obtain first feature information; and obtain second feature information based on the key point information of the target object, including: inputting the target image and the key point information of the target object into a second neural network for processing to obtain second feature information.

In some embodiments, the processor is configured to: convolute the depth information of the target object and the key point information of the target object to obtain a first convolution result; down-sample the first convolution result to obtain a first down-sampling result; and obtain first feature information based on the first down-sampling result.

In some embodiments, the processor is configured to: convolute the target image and the key point information of the target object to obtain a second convolution result; down-sample the second convolution result to obtain a second down-sampling result; and obtain second feature information based on the second down-sampling result.

In some embodiments, the processor is configured to: perform fusion processing on the first feature information and the second feature information to obtain third feature information; and determine a living body detection result of the target object according to the third feature information.

In some embodiments, the processor is configured to: obtain a probability that the target object is a living body based on the third feature information; and determine a living body detection result of the target object according to the probability that the target object is a living body. In the method for detecting a living body according to various aspects of this disclosure, living body detection is performed by combining depth information of a target object and a target image. Thus, living body detection can be performed by means of the depth information of the target object and key point information of the target object in the target image, thereby improving the accuracy of living body detection. Other features and aspects of this disclosure can be described more clearly according to the detailed descriptions of the exemplary embodiments in the accompanying drawings.

BRIEF DESCRIPTION OF THE DRAWINGS

The accompanying drawings included in the specification and constituting a part of the specification illustrate the exemplary embodiments, features, and aspects of this disclosure together with the specification, and are used for explaining the principles of this disclosure.

DETAILED DESCRIPTION

Figure 1:
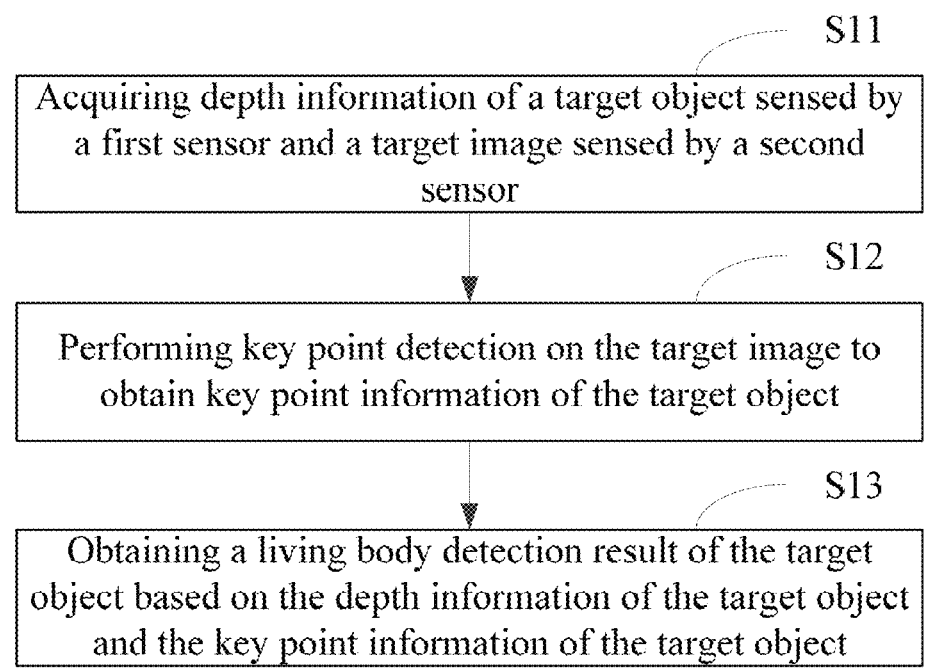
FIG. 1 illustrates a flowchart of a method for detecting a living body according to an embodiment of this disclosure.

The various exemplary embodiments, features, and aspects of this disclosure are described below in detail with reference to the accompanying drawings. The same reference numerals in the accompanying drawings represent elements having the same or similar functions. Although the various aspects of the embodiments are illustrated in the accompanying drawings, unless stated particularly, it is not required to draw the accompanying drawings in proportion. The special word "exemplary" here means "used as examples, embodiments, or descriptions". Any "exemplary" embodiment given here is not necessarily construed as being superior to or better than other embodiments. In addition, numerous details are given in the following detailed description for the purpose of better explaining this disclosure. It should be understood by persons skilled in the art that this disclosure can still be implemented even without some of those details. In some of the examples, methods, means, elements, and circuits that are well known to persons skilled in the art are not described in detail so that the principle of this disclosure becomes apparent.

FIG. 1 is a flowchart of a method for detecting a living body according to an embodiment of this disclosure. The method may be applied in a terminal device having a face recognition function, such as a mobile phone, a tablet computer, a digital camera, or an access control device, and the method may be applied in face unlocking, face payment, unmanned supermarkets, video surveillance, and other scenarios. As shown in FIG. 1, the method includes steps S11 to S13.

At step S11, depth information of a target object sensed by a first sensor and a target image sensed by a second sensor are acquired.

In some embodiments, the target object is a face. In some embodiments, the first sensor is a 3 Dimensions (3D) sensor. For example, the first sensor may be a ToF sensor, a structured light sensor, a binocular sensor, or other types of depth sensors. By acquiring depth information of the target object using a 3D sensor, high-precision depth information can be obtained. In the embodiment of this disclosure, living body detection is performed using depth information of the target object, and the depth information of the target object can be fully dug up, thereby improving the accuracy of living body detection. For example, when the target object is a face, in the embodiment of this disclosure, living body detection is performed using depth information of the face, and the depth information of face data can be fully dug up, thereby improving the accuracy of real face detection.

It should be noted that although the first sensor is described above with a ToF sensor, a structured light sensor, and a binocular sensor, persons skilled in the art can understand that the embodiment of this disclosure is not limited thereto. Persons skilled in the art can flexibly select the type of the first sensor according to actual application scenarios and/or personal preferences, as long as the depth information of the target object can be sensed by means of the first sensor.

In the embodiment of this disclosure, the depth information of the target object may be any information that can indicate the depth of the target object. The embodiment of this disclosure does not define the specific implementation of the depth information of the target object. In some embodiments, the depth information of the target object may be a depth image of the target object. In some other embodiments, the depth information of the target object may be a point cloud of the target object, where 3D coordinates of various points of the target object may be recorded in the point cloud of the target object. In some other embodiments, the depth information of the target object may be a table or other types of files in which the depths of various points of the target object are recorded. In some embodiments, the second sensor may be an RGB (Red, Green, and Blue) sensor or a near-infrared sensor. If the second sensor is an RGB sensor or other types of image sensors, the target image sensed by the second sensor is an RGB image. If the second sensor is a near-infrared sensor, the target image sensed by the second sensor is a near-infrared image. The near-infrared image may be a near-infrared image with a light spot, and may also be a near-infrared image without a light spot, etc. It should be noted that although the second sensor is described above with an RGB sensor and a near-infrared sensor, persons skilled in the art can understand that the embodiment of this disclosure is not limited thereto. Persons skilled in the art can flexibly select the type of the second sensor according to actual application scenarios and/or personal preferences, as long as key point information of the target object can be obtained by means of the target image sensed by the second sensor.

In some embodiments, a depth map and the target image are collected by means of a 3D camera, where the 3D camera includes an image sensor configured to collect an image and a depth sensor configured to collect depth information. For example, a terminal device collects 3D information of the target object by means of a 3D camera disposed in the terminal device. In some other embodiments, the depth information and target image are acquired from other devices, for example, receiving a living body detection request sent by a terminal device, the living body detection request carrying the depth information and target image.

At step S12, key point detection is performed on the target image to obtain key point information of the target object.

The key point information of the target object may include location information of a key point of the target object.

In the embodiment of this disclosure, if the target object is a face, the key point of the target object may include one or more of an eye key point, an eyebrow key point, a nose key point, a mouth key point, a face contour key point, etc. The eye key point may include one or more of an eye contour key point, a canthus key point, a pupil key point, etc.

At step S13, a living body detection result of the target object is obtained based on the depth information of the target object and the key point information of the target object.

The living body detection result of the target object may be that the target object is a living body, or the target object is a fake body. For example, the living body detection result of the target object may be that the target object is a real face, or the target object is a fake face.

In the embodiment of this disclosure, living body detection is performed by combining depth information of a target object and a target image. Thus, living body detection can be performed by means of the depth information of the target object and key point information of the target object in the target image, thereby improving the accuracy of living body detection.

Figure 2:
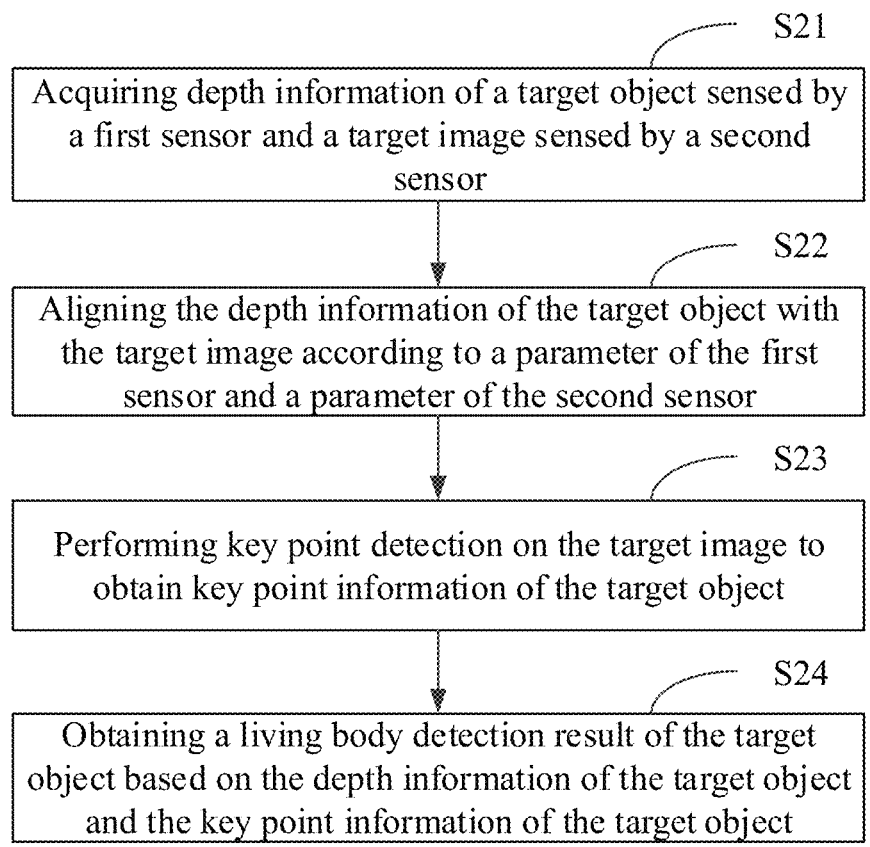
FIG. 2 illustrates an exemplary flowchart of a method for detecting a living body according to an embodiment of this disclosure.

FIG. 2 is an exemplary flowchart of a method for detecting a living body according to an embodiment of this disclosure. As shown in FIG. 2, the method may include steps S21 to S24.

At step S21, depth information of a target object sensed by a first sensor and a target image sensed by a second sensor are acquired. For step S21, please refer to the description of step S11 above. At step S22, the depth information of the target object is aligned with the target image according to a parameter of the first sensor and a parameter of the second sensor.

In some embodiments, the depth information of the target object may be converted, to make the converted depth information aligned with the target image. For example, if the depth information of the target object is a depth image of the target object, a conversion matrix from a parameter matrix of the first sensor to a parameter matrix of the second sensor is determined according to the parameter matrix of the first sensor and the parameter matrix of the second sensor; and the depth image of the target object is converted according to the conversion matrix.

In some other embodiments, the target image may be converted, to make the converted target image be aligned with the depth information. For example, if the depth information of the target object is a depth image of the target object, a conversion matrix from a parameter matrix of the second sensor to a parameter matrix of the first sensor is determined according to the parameter matrix of the first sensor and the parameter matrix of the second sensor; and the target image is converted according to the conversion matrix.

In the embodiment of this disclosure, the parameter of the first sensor may include an intrinsic parameter and/or an extrinsic parameter of the first sensor, and the parameter of the second sensor may include an intrinsic parameter and/or an extrinsic parameter of the second sensor.

In the embodiment of this disclosure, if the depth information of the target object is a depth image of the target object, by aligning the depth information of the target object with the target image, the depth image of the target object and a corresponding part in the target image can be located at the same position in the two images.

At step S23, key point detection is performed on the target image to obtain key point information of the target object. For step S23, please refer to the description of step S12 above.

At step S24, a living body detection result of the target object is obtained based on the depth information of the target object and the key point information of the target object. For step S24, please refer to the description of step S13 above.

Figure 3:
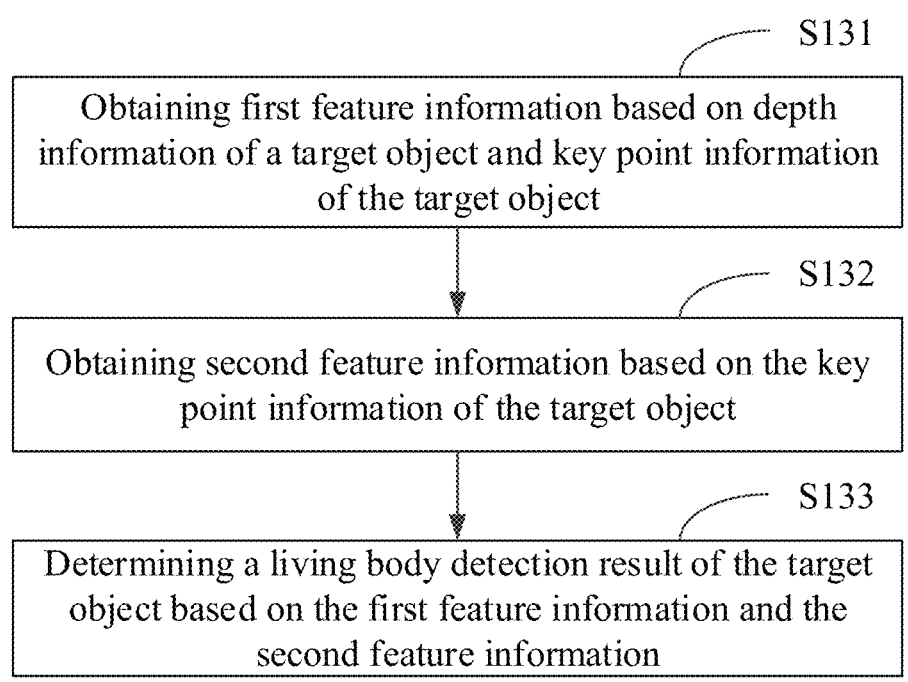
FIG. 3 illustrates an exemplary flowchart of step S13 of a method for detecting a living body according to an embodiment of this disclosure.

FIG. 3 is an exemplary flowchart of step S13 of a method for detecting a living body according to an embodiment of this disclosure. As shown in FIG. 3, step S13 may include steps S131 to S133.

At step S131, first feature information is obtained based on depth information of a target object and key point information of the target object.

In some embodiments, the obtaining first feature information based on depth information of a target object and key point information of the target object includes: inputting depth information of a target object and key point information of the target object into a first neural network for processing to obtain first feature information. As an example of the implementation, the first neural network may include a convolution layer, a down-sampling layer, and a full connection layer. For example, the first neural network may include a stage of convolution layer, a stage of down-sampling layer, and a stage of full connection layer. The stage of convolution layer may include one or more convolution layers, the stage of down-sampling layer may include one or more down-sampling layers, and the stage of full connection layer may include one or more full connection layers. For another example, the first neural network may include multiple stages of convolution layers, multiple stages of down-sampling layers, and a stage of full connection layer. Each stage of convolution layer may include one or more convolution layers, each stage of down-sampling layer may include one or more down-sampling layers, and the stage of full connection layer may include one or more full connection layers. The $i^{th}$-stage down-sampling layer is cascaded after the $i^{th}$-stage convolution layer, the $(i+1)^{th}$-stage convolution layer is cascaded after the $i^{th}$-stage down-sampling layer, and the full connection layer is cascaded after the $n^{th}$-stage down-sampling layer, where i and n are both positive integers, $1 \le i \le n$, and n represents the number of respective stages of the convolution layers and the down-sampling layers in the first neural network.

As another example of the implementation, the first neural network may include a convolution layer, a down-sampling layer, a normalization layer, and a full connection layer. For example, the first neural network may include a stage of convolution layer, a normalization layer, a stage of down-sampling layer, and a stage of full connection layer. The stage of convolution layer may include one or more convolution layers, the stage of down-sampling layer may include one or more down-sampling layers, and the stage of full connection layer may include one or more full connection layers.

For another example, the first neural network may include multiple stages of convolution layers, multiple normalization layers, multiple stages of down-sampling layers, and a stage of full connection layer. Each stage of convolution layer may include one or more convolution layers, each stage of down-sampling layer may include one or more down-sampling layers, and the stage of full connection layer may include one or more full connection layers. The $i^{th}$ normalization layer is cascaded after the $i^{th}$-stage convolution layer, the $i^{th}$-stage down-sampling layer is cascaded after the $i^{th}$ normalization layer, the $(i+1)^{th}$-stage convolution layer is cascaded after the $i^{th}$-stage down-sampling layer, and the full connection layer is cascaded after the $n^{th}$-stage down-sampling layer, where i and n are both positive integers, $1 \le i \le n$, and n represents the number of respective stages of the convolution layers and the down-sampling layers and the number of the normalization layers in the first neural network.

At step S132, second feature information is obtained based on the key point information of the target object.

In some embodiments, the obtaining second feature information based on the key point information of the target object includes: inputting a target image and the key point information of the target object into a second neural network for processing to obtain second feature information.

As an example of the implementation, the second neural network may include a convolution layer, a down-sampling layer, and a full connection layer.

For example, the second neural network may include a stage of convolution layer, a stage of down-sampling layer, and a stage of full connection layer. The stage of convolution layer may include one or more convolution layers, the stage of down-sampling layer may include one or more down-sampling layers, and the stage of full connection layer may include one or more full connection layers. For another example, the second neural network may include multiple stages of convolution layers, multiple stages of down-sampling layers, and a stage of full connection layer. Each stage of convolution layer may include one or more convolution layers, each stage of down-sampling layer may include one or more down-sampling layers, and the stage of full connection layer may include one or more full connection layers. The $j^{th}$-stage down-sampling layer is cascaded after the $j^{th}$-stage convolution layer, the $(j+1)^{th}$-stage convolution layer is cascaded after the $j^{th}$-stage down-sampling layer, and the full connection layer is cascaded after the $m^{th}$-stage down-sampling layer, where j and m are both positive integers, $1 \le j \le m$, and m represents the number of respective stages of the convolution layers and the down-sampling layers in the second neural network.

As another example of the implementation, the second neural network may include a convolution layer, a down-sampling layer, a normalization layer, and a full connection layer. For example, the second neural network may include a stage of convolution layer, a normalization layer, a stage of down-sampling layer, and a stage of full connection layer. The stage of convolution layer may include one or more convolution layers, the stage of down-sampling layer may include one or more down-sampling layers, and the stage of full connection layer may include one or more full connection layers. For another example, the second neural network may include multiple stages of convolution layers, multiple normalization layers, multiple stages of down-sampling layers, and a stage of full connection layer. Each stage of convolution layer may include one or more convolution layers, each stage of down-sampling layer may include one or more down-sampling layers, and the stage of full connection layer may include one or more full connection layers. The $i^{th}$ normalization layer is cascaded after the $j^{th}$-stage convolution layer, the $j^{th}$-stage down-sampling layer is cascaded after the $j^{th}$ normalization layer, the $(j+1)^{th}$-stage convolution layer is cascaded after the $j^{th}$-stage down-sampling layer, and the full connection layer is cascaded after the $m^{th}$-stage down-sampling layer, where j and m are both positive integers, $1 \le j \le m$, and m represents the number of respective stages of the convolution layers and the down-sampling layers and the number of the normalization layers in the second neural network.

In some embodiments, the first neural network and the second neural network have the same network structure.

At step S133, a living body detection result of the target object is determined based on the first feature information and the second feature information.

It should be noted that the embodiment of this disclosure does not define the sequence of executing steps S131 and S132, as long as steps S131 and S132 are executed before step S133. For example, step S131 may be executed first and step S132 is then executed, or step S132 may be executed first and step S131 is then executed, or steps S131 and S132 may be simultaneously executed.

Figure 5:
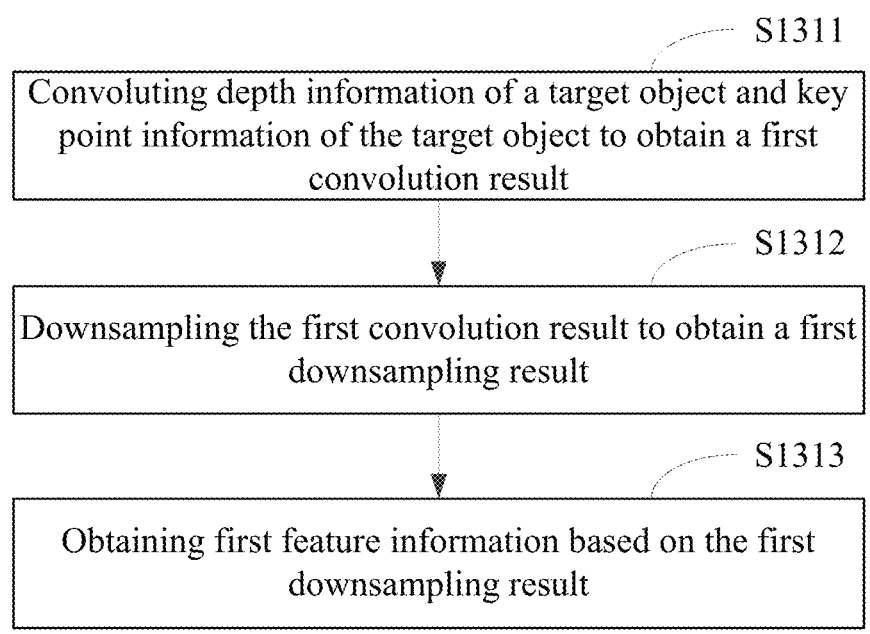
FIG. 5 illustrates an exemplary flowchart of step S131 of a method for detecting a living body according to an embodiment of this disclosure.

FIG. 5 is an exemplary flowchart of step S131 of a method for detecting a living body according to an embodiment of this disclosure. As shown in FIG. 5, step S131 may include steps S1311 to S1313.

At step S1311, depth information of a target object and key point information of the target object are convoluted to obtain a first convolution result.

At step S1312, the first convolution result is down-sampled to obtain a first down-sampling result.

In some embodiments, depth information of a target object and key point information of the target object may be convoluted and down-sampled by means of a stage of convolution layer and a stage of down-sampling layer. The stage of convolution layer may include one or more convolution layers, and the stage of down-sampling layer may include one or more down-sampling layers.

In another possible implementation, depth information of a target object and key point information of the target object may be convoluted and down-sampled by means of multiple stages of convolution layers and multiple stages of down-sampling layers. Each stage of convolution layer may include one or more convolution layers, and each stage of down-sampling layer may include one or more down-sampling layers.

In some embodiments, the down-sampling the first convolution result to obtain a first down-sampling result may include: normalizing the first convolution result to obtain a first normalization result; and down-sampling the first normalization result to obtain a first down-sampling result.

At step S1313, first feature information is obtained based on the first down-sampling result.

In some embodiments, the first down-sampling result may be input to a full connection layer, and the full connection layer performs fusion processing (for example, full connection operation) on the first down-sampling result to obtain first feature information.

Figure 6:
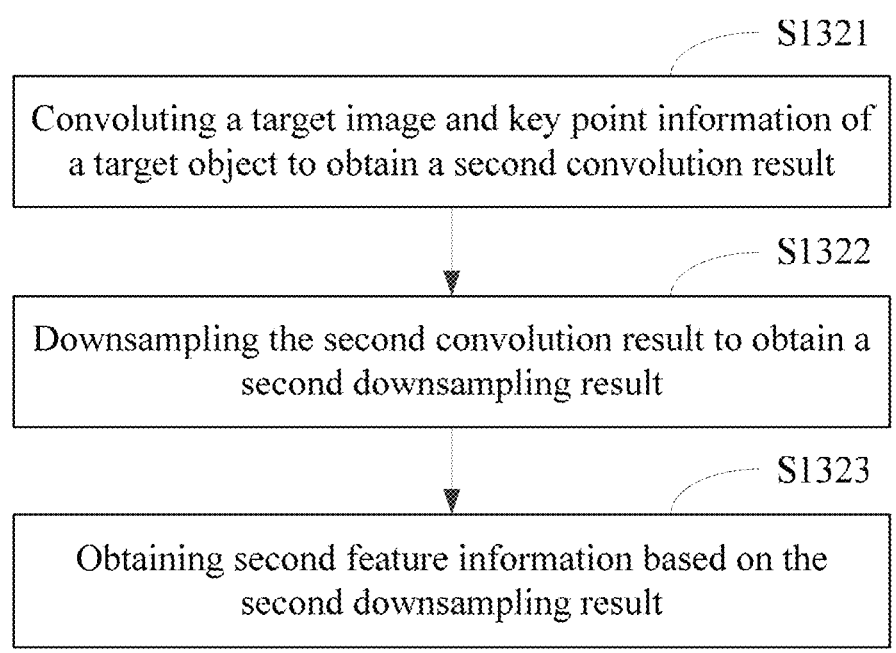
FIG. 6 illustrates an exemplary flowchart of step S132 of a method for detecting a living body according to an embodiment of this disclosure.

FIG. 6 is an exemplary flowchart of step S132 of a method for detecting a living body according to an embodiment of this disclosure. As shown in FIG. 6, step S132 may include steps S1321 to S1323.

At step S1321, a target image and key point information of a target object are convoluted to obtain a second convolution result.

At step S1322, the second convolution result is down-sampled to obtain a second down-sampling result.

In some embodiments, a target image and key point information of a target object may be convoluted and down-sampled by means of a stage of convolution layer and a stage of down-sampling layer. The stage of convolution layer may include one or more convolution layers, and the stage of down-sampling layer may include one or more down-sampling layers. In another possible implementation, a target image and key point information of a target object may be convoluted and down-sampled by means of multiple stages of convolution layers and multiple stages of down-sampling layers. Each stage of convolution layer may include one or more convolution layers, and each stage of down-sampling layer may include one or more down-sampling layers. In some embodiments, the down-sampling the second convolution result to obtain a second down-sampling result may include: normalizing the second convolution result to obtain a second normalization result; and down-sampling the second normalization result to obtain a second down-sampling result.

At step S1323, second feature information is obtained based on the second down-sampling result.

In some embodiments, the second down-sampling result may be input to a full connection layer, and the full connection layer performs fusion processing (for example, full connection operation) on the second down-sampling result to obtain second feature information.

Figure 7:
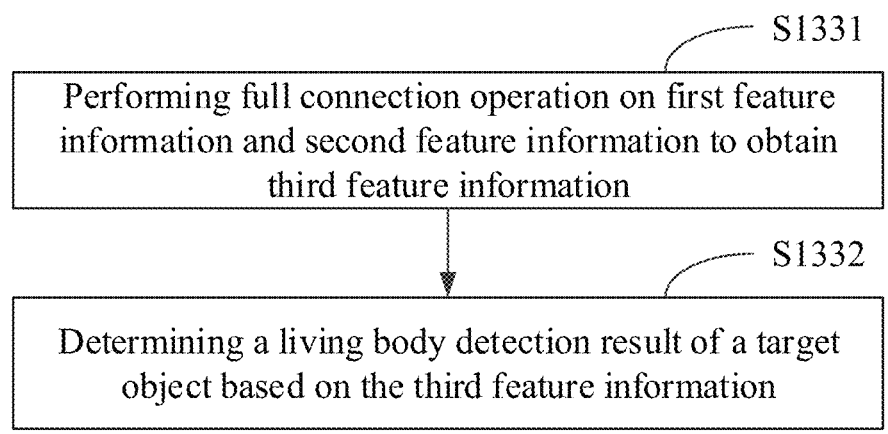
FIG. 7 illustrates an exemplary flowchart of step S133 of a method for detecting a living body according to an embodiment of this disclosure.

FIG. 7 is an exemplary flowchart of step S133 of a method for detecting a living body according to an embodiment of this disclosure. As shown in FIG. 7, step S133 may include steps S1331 and S1332.

At step S1331, fusion processing (for example, full connection operation) is performed on first feature information and second feature information to obtain third feature information.

In some embodiments, first feature information and second feature information may be connected (for example, subjected to channel overlay) or added to obtain third feature information. In an example, a full connection layer performs full connection operation on first feature information and second feature information to obtain third feature information.

At step S1332, a living body detection result of a target object is determined based on the third feature information.

Figure 8:
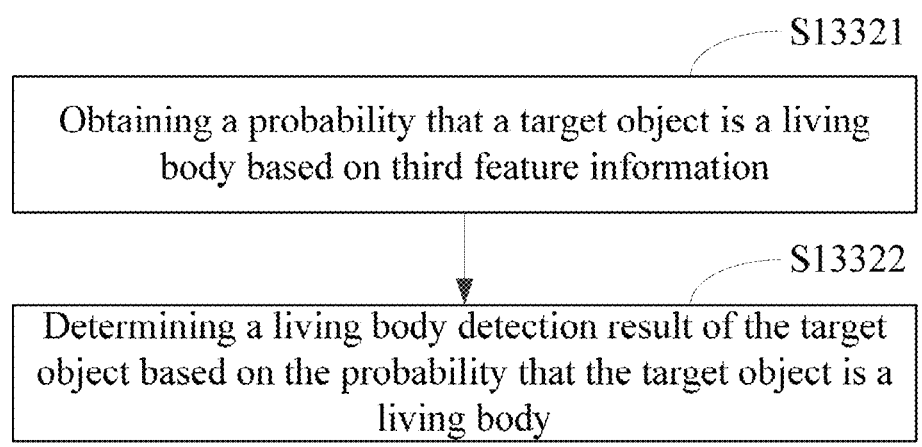
FIG. 8 illustrates an exemplary flowchart of step S1332 of a method for detecting a living body according to an embodiment of this disclosure.

FIG. 8 is an exemplary flowchart of step S1332 of a method for detecting a living body according to an embodiment of this disclosure. As shown in FIG. 8, step S1332 may include steps S13321 and S13322.

At step S13321, a probability that the target object is a living body is obtained based on third feature information.

In some embodiments, the third feature information may be input to a Softmax layer to obtain the probability that the target object is a living body by means of the Softmax layer. As an example of the implementation, the Softmax layer may include two neurons, where one neuron represents the probability that the target object is a living body, and the other neuron represents the probability that the target object is a fake body.

At step S13322, a living body detection result of the target object is determined based on the probability that the target object is a living body.

In some embodiments, the determining a living body detection result of the target object according to the probability that the target object is a living body includes: if the probability that the target object is a living body is greater than a first threshold, determining that the living body detection result of the target object is that the target object is a living body; and if the probability that the target object is a living body is less than or equal to the first threshold, determining that the living body detection result of the target object is that the target object is a fake body. It should be noted that although the implementation of step S1332 is described above with the procedures shown in FIG. 8, persons skilled in the art can understand that the embodiment of this disclosure is not limited thereto. In another possible implementation, a probability that a target object is a fake body may be obtained based on the third feature information, and a living body detection result of the target object is determined according to the probability that the target object is a fake body. In the implementation, if the probability that the target object is a fake body is greater than a second threshold, it is determined that the living body detection result of the target object is that the target object is a fake body; and if the probability that the target object is a fake body is less than or equal to the second threshold, it is determined that the living body detection result of the target object is that the target object is a living body.

In the embodiment of this disclosure, living body detection is performed by combining depth information of a target object and a target image. Thus, living body detection can be performed by means of the depth information of the target object and key point information of the target object in the target image, thereby improving the accuracy of living body detection. Moreover, the computation complexity is low, and a relatively accurate living body detection result can still be obtained when the camera is slightly shaken or shocked.

With the development of face recognition technology, the accuracy of face recognition is higher than that of fingerprint recognition. Therefore, face recognition technology is widely used in various scenarios, such as video surveillance, face unlocking, and face payment. However, in face recognition, there are risks of being easily hacked. Living body detection is an absolutely necessary part in face recognition applications.

In monocular living body detection, an image collected by an ordinary camera is used as input, and there is a disadvantage that a high-definition seamless hack image may be easily succeeded in the detection. In binocular living body detection technology, two cameras (ordinary RGB cameras or ordinary near-infrared cameras) are used as input, and the performance is superior to monocular living body detection. However, computing depth distribution information of a face by means of binocular matching has the disadvantages of large computation amount and low depth information accuracy. Moreover, camera parameters may easily change when the camera is shaken or shocked, making computation invalid. In recent years, 3D sensor technology has developed rapidly, including ToF sensors, structured light sensors, binocular sensors, etc., enabling users to conveniently obtain high-precision depth information from the sensors directly. In the embodiment of this disclosure, 3D data and near-infrared data or data of a RGB color mode are used as input to obtain face key point information by means of a near-infrared map or an RGB map, and then by fusing one or more of a face 3D depth map, a near-infrared or RGB map, the face key point information, a canthus feature, a pupil feature, etc., and using a depth learning model, a real face and a hack can be more effectively distinguished.

Figure 4A:
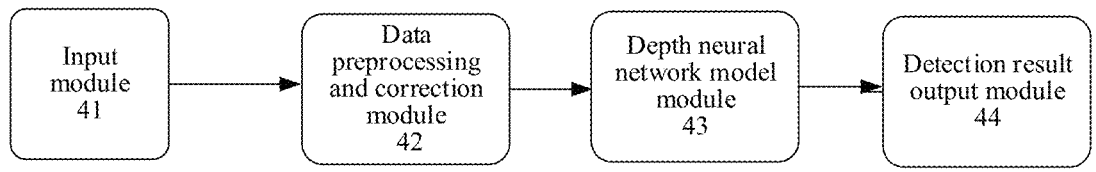
FIG. 4A illustrates a block diagram of an apparatus for detecting a living body for a face according to an embodiment of this disclosure.

FIG. 4A is a schematic block diagram of an apparatus for detecting a living body for a face according to an embodiment of this disclosure. As shown in FIG. 4A, the apparatus for detecting a living body includes an input module 41, a data preprocessing module 42, a depth neural network module 43, and a detection result output module 44.

The input module 41 is suitable for data input of different hardware modules. The data input form of the input module includes one or more of the followings: a depth map, a pure near-infrared map, a near-infrared map with a light spot, an RGB map, etc. The specific combination is determined by means of different hardware schemes.

Figure 4B:
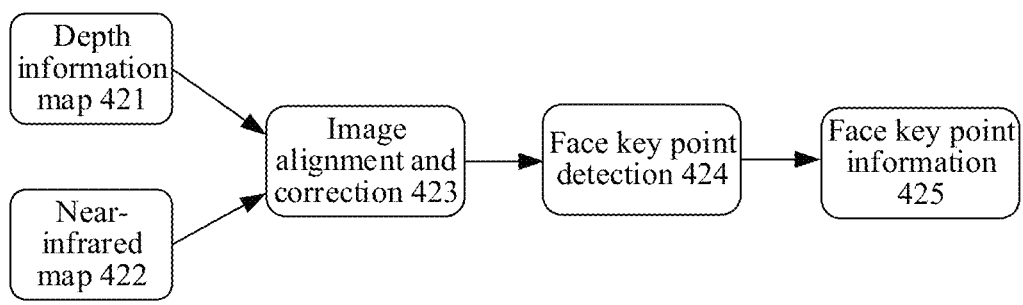
FIG. 4B illustrates a block diagram of a data preprocessing module in FIG. 4A according to an embodiment of this disclosure.

The data preprocessing module 42 is configured to preprocess data input by the input module to obtain data required by a depth neural network. FIG. 4B is an exemplary block diagram of an implementation of the data preprocessing module 42 in FIG. 4A according to an embodiment of this disclosure, where input of the data preprocessing module includes: a depth map obtained by a depth sensor and an image obtained by an image sensor (a pure near-infrared map, an infrared map with a light spot, an RGB map, etc.). In the example shown in FIG. 4B, the depth map 421 and the near-infrared map 422 are used as input of the data preprocessing module 42. In some possible implementations, processing of input data by the data preprocessing module includes: image alignment/correction 423 and face key point detection 424, where face key point detection may be implemented by means of a face key point model.

In the image alignment/correction 423, if a depth map and a near-infrared map (or RGB map) are not synchronously aligned, it needs to align/correct the input depth map and near-infrared map according to parameter matrices of the cameras to achieve image alignment.

In the face key point detection 424, the near-infrared map (or RGB map) is input to the face key point model for face key point detection to obtain face key point information 425.

Figure 4C:
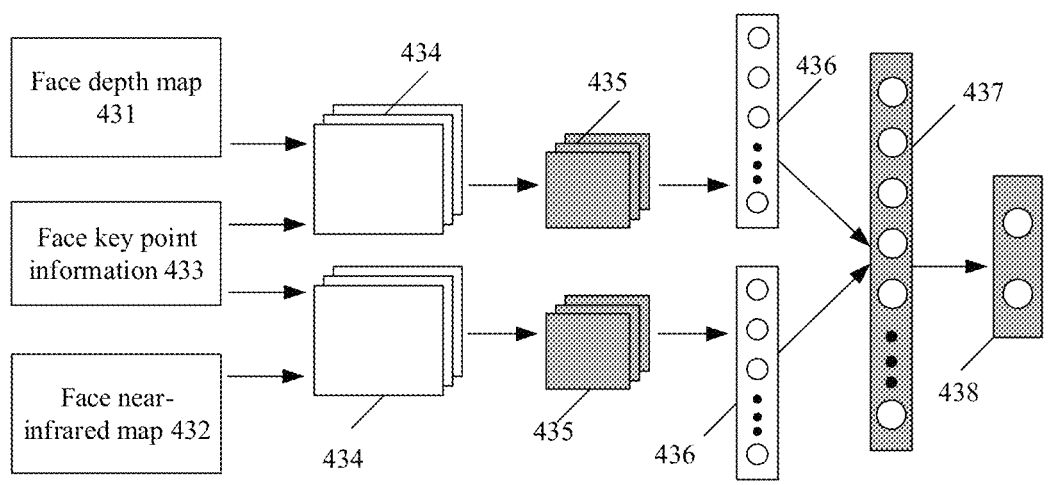
FIG. 4C illustrates a block diagram of a depth neural network module in FIG. 4A according to an embodiment of this disclosure.

Output of the data preprocessing module corresponds to the input in form, and includes an aligned/corrected face depth map (corresponding to the input depth map 421), a face near-infrared map (corresponding to the input near-infrared map 422), and the face key point information. In some embodiments, the depth neural network module 43 is a binary classification model. For example, for a real face, the classification label is 0, and for a face of a hack, the classification label is 1. For another example, for a real face, the classification label is 1, and for a face of a hack, the classification label is 0, etc. FIG. 4C is a block diagram of an example of the depth neural network module in FIG. 4A according to an embodiment of this disclosure. As shown in FIG. 4C, input of the depth neural network module includes: a face depth map 431, a face near-infrared map 432 (or a two-dimensional face image of other forms), and face key point information 433 obtained after the data preprocessing module. In some embodiments, output of the depth neural network module includes: a determining score, i.e., the probability of being determined as a real person or a hack. The output of the depth neural network is a binary value. The output score is compared with a preset threshold. The threshold setting may be adjusted according to the accuracy and recall rate. For example, if the output score of the neural network is greater than the threshold, it is determined as a hack, and if the output score is less than the threshold, it is determined as a living body, etc.

In the example shown in FIG. 4C, the depth neural network is a multi-branch model, and the number of branches is determined by the number of input images. In FIG. 4C, by taking a face depth map and a face near-infrared map as an example, the depth neural network includes two branches. Each branch includes multiple convolution layers 434 and down-sampling layers 435, and a full connection layer 436. The face depth map 431 and the face key point information 433 are input to the first branch for feature extraction, the face near-infrared map 432 and the face key point information 433 are input to the second branch for feature extraction, then features extracted by the multiple branches are connected together and input to a full connection layer 437, and finally, an output result is obtained after the processing by means of a Softmax layer 438. There are two neurons in the output layer, respectively representing the probabilities of a real person and a hack. It should be noted that the input of each of the two branches in FIG. 4C includes the face key point information, and the full connection layer 437 fuses the feature information output by the full connection layers 436 of the two branches together by means of the face key point information. It is assumed that the full connection layer 436 in the first branch outputs first feature information and the full connection layer 436 in the second branch outputs second feature information, the full connection layer 437 fuses the first feature information and the second feature information using the face key point information by means of full connection operation. In other words, in the embodiment of this disclosure, the face depth map and the face near-infrared map are fused using the face key point information to obtain a final output result.

The detection result output module 44 has multiple output modes. In an example, for a real face, the output result is identified as 0, and for a face of a hack, the output result is identified as 1. However, the embodiment of this disclosure does not define this.

The technical solution provided by the embodiment of this disclosure has at least one of the following features:

1) In some embodiments, on one hand, a 3D sensor with depth information and other auxiliary images, such as a near-infrared image, an RGB image, etc., are combined. That is, multiple new types of 3D data are used as the basis of face depth data distribution. In the other hand, the proposed framework may be applied to multiple 3D sensor input forms, including a 3D depth map provided by a ToF camera plus a near-infrared map, a 3D depth map provided by a structured light camera plus a near-infrared map with a light spot, a 3D depth map plus an RGB map, a 3D depth map plus a near-infrared map plus an RGB map, and other forms including a 3D depth map and a near-infrared map or an RGB map. Moreover, in the related art, an ordinary camera and a binocular camera are mainly used, depth information of face data is not fully dug up, and there is a disadvantage that a high-definition seamless hack may easily succeeds in the detection. However, in the embodiment of this disclosure, a two-dimensional hack can be prevented by using a face depth map collected by a 3D sensor.

2) In some embodiments, 3D depth information, other near-infrared data or RGB data, face key point information, and canthus and pupil features are fused to distinguish a real person and a hack by means of training of a depth learning model. In a related detection method, single data is mainly used, and the correlation and complementarity between multimodal data are not utilized. That is to say, in a conventional binocular calculation method, there are defects of high computation complexity and low precision, while in the embodiment of this disclosure, current 3D sensing technology can be effectively used to obtain more accurate 3D face data distribution.

3) In some embodiments, a multi-branch model is combined. The multi-branch model can fully fuse multimodal data, is compatible with multiple data forms, and can learn real face information features by means of a neural network. In the embodiment of this disclosure, biometric fusion technology in multiple dimensions, such as face depth information, near-infrared face information or RGB map face information, face key point information, the canthi, the eyes, and the pupils, is combined to overcome the disadvantage that a single technology is easy to be hacked.

Figure 9:
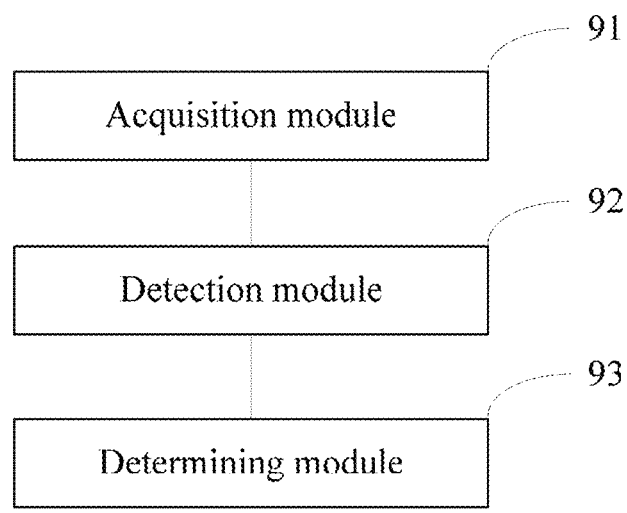
FIG. 9 illustrates a block diagram of an apparatus for detecting a living body according to an embodiment of this disclosure.

FIG. 9 is a block diagram of an apparatus for detecting a living body according to an embodiment of this disclosure. As shown in FIG. 9, the apparatus includes: an acquisition module 91, configured to acquire depth information of a target object sensed by a first sensor and a target image sensed by a second sensor; a detection module 92, configured to perform key point detection on the target image to obtain key point information of the target object; and a determining module 93, configured to obtain a living body detection result of the target object based on the depth information of the target object and the key point information of the target object. In some embodiments, the target object is a face. In some embodiments, the second sensor is an RGB sensor or a near-infrared sensor.

Figure 10:
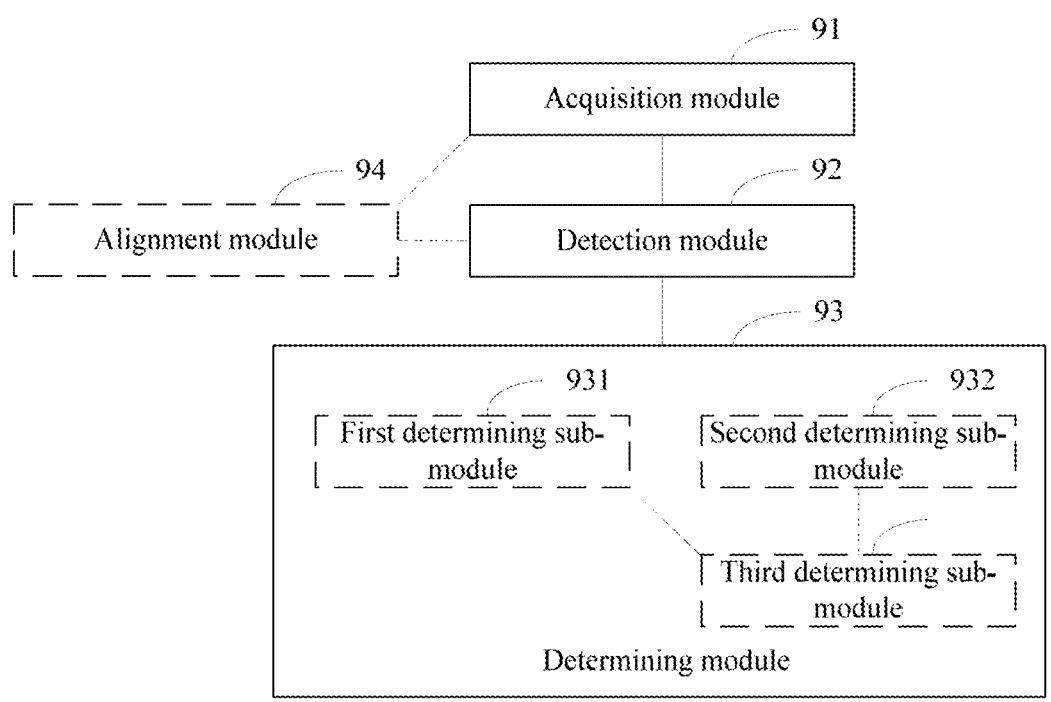
FIG. 10 illustrates an exemplary block diagram of an apparatus for detecting a living body according to an embodiment of this disclosure.

FIG. 10 is an exemplary block diagram of an apparatus for detecting a living body according to an embodiment of this disclosure. As shown in FIG. 10:

In some embodiments, the apparatus further includes: an alignment module 94, configured to align the depth information of the target object with the target image according to a parameter of the first sensor and a parameter of the second sensor.

In some embodiments, the determining module 93 includes: a first determining sub-module 931, configured to obtain first feature information based on the depth information of the target object and the key point information of the target object; a second determining sub-module 932, configured to obtain second feature information based on the key point information of the target object; and a third determining sub-module 933, configured to determine a living body detection result of the target object based on the first feature information and the second feature information.

In some embodiments, the first determining sub-module 931 is configured to input the depth information of the target object and the key point information of the target object into a first neural network for processing to obtain first feature information; and the second determining sub-module 932 is configured to input the target image and the key point information of the target object into a second neural network for processing to obtain second feature information. In some embodiments, the first neural network and the second neural network have the same network structure.

In some embodiments, the first determining sub-module 931 includes: a first convolution unit, configured to convolute the depth information of the target object and the key point information of the target object to obtain a first convolution result; a first down-sampling unit, configured to down-sample the first convolution result to obtain a first down-sampling result; and a first determining unit, configured to obtain first feature information based on the first down-sampling result.

In some embodiments, the second determining sub-module 932 includes: a second convolution unit, configured to convolute the target image and the key point information of the target object to obtain a second convolution result; a second down-sampling unit, configured to down-sample the second convolution result to obtain a second down-sampling result; and a second determining unit, configured to obtain second feature information based on the second down-sampling result.

In some embodiments, the third determining sub-module 933 includes: a full connection unit, configured to perform fusion processing (for example, full connection operation) on the first feature information and the second feature information to obtain third feature information; and a third determining unit, configured to determine a living body detection result of the target object according to the third feature information.

In some embodiments, the third determining unit includes: a first determining subunit, configured to obtain a probability that the target object is a living body based on the third feature information; and a second determining subunit, configured to determine a living body detection result of the target object according to the probability that the target object is a living body. In the embodiment of this disclosure, living body detection is performed by combining depth information of a target object and a target image. Thus, living body detection can be performed by means of the depth information of the target object and key point information of the target object in the target image, thereby improving the accuracy of living body detection, and preventing fake body image hack.

Figure 11:
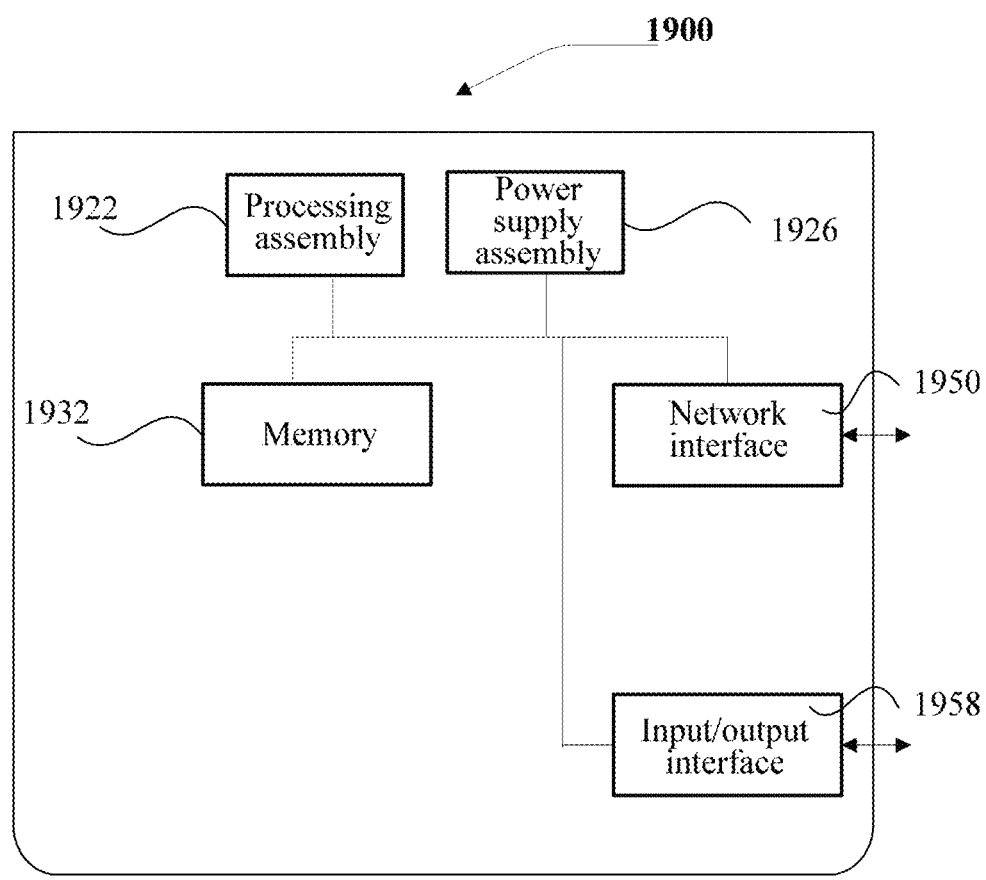
FIG. 11 illustrates a block diagram of an apparatus for detecting a living body 800 according to an exemplary embodiment.

FIG. 11 is a block diagram of an apparatus for detecting a living body 800 according to an exemplary embodiment. For example, the apparatus 800 may be a mobile phone, a computer, a digital broadcast terminal, a message transceiver device, a game console, a tablet device, a medical device, exercise equipment, a personal digital assistant, etc. With reference to FIG. 11, the apparatus 800 may include one or more of the following assemblies: a processing assembly 802, a memory 804, a power supply assembly 806, a multimedia assembly 808, an audio assembly 810, an Input/Output (I/O) interface 812, a sensor assembly 814, and a communication assembly 816.

The processing assembly 802 generally controls overall operation of the apparatus 800, such as operations associated with display, phone calls, data communications, camera operations, and recording operations. The processing assembly 802 may include one or more processors 820 to execute instructions to implement all or some of the steps of the method above. In addition, the processing assembly 802 may include one or more modules to facilitate interaction between the processing assembly 802 and other assemblies. For example, the processing assembly 802 may include a multimedia module to facilitate interaction between the multimedia assembly 808 and the processing assembly 802.

The memory 804 is configured to store various types of data to support operations on the apparatus 800. Examples of the data include instructions for any application or method operated on the apparatus 800, contact data, contact list data, messages, pictures, videos, and etc. The memory 804 may be implemented by any type of volatile or non-volatile storage device, or a combination thereof, such as a Static Random-Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a disk or an optical disk. The power supply assembly 806 provides power to various assemblies of the apparatus 800. The power supply assembly 806 may include a power management system, one or more power supplies, and other assemblies associated with power generation, management, and distribution for the apparatus 800.

The multimedia assembly 808 includes a screen between the apparatus 800 and a user that provides an output interface. In some embodiments, the screen may include a Liquid Crystal Display (LCD) and a Touch Panel (TP). If the screen includes a TP, the screen may be implemented as a touch screen to receive input signals from the user. The TP includes one or more touch sensors for sensing touches, slides, and gestures on the TP. The touch sensor may not only sense the boundary of a touch or slide action, but also detect the duration and pressure related to the touch or slide operation. In some embodiments, the multimedia assembly 808 includes a front-facing camera and/or a rear-facing camera. When the apparatus 800 is in an operation mode, for example, a photographing mode or a video mode, the front-facing camera and/or the rear-facing camera may receive external multimedia data. Each of the front-facing camera and the rear-facing camera may be a fixed optical lens system, or have focal length and optical zoom capabilities. The audio assembly 810 is configured to output and/or input an audio signal. For example, the audio assembly 810 includes a Microphone (MIC), and the MIC is configured to receive an external audio signal when the apparatus 800 is in an operation mode, such as a calling mode, a recording mode, and a voice recognition mode. The received audio signal may be further stored in the memory 804 or transmitted by means of the communication assembly 816. In some embodiments, the audio assembly 810 further includes a speaker for outputting the audio signal. The I/O interface 812 provides an interface between the processing assembly 802 and a peripheral interface module, and the peripheral interface module may be a keyboard, a click wheel, a button, etc. The button may include, but is not limited to, a home button, a volume button, a start button, and a lock button.

The sensor assembly 814 includes one or more sensors for providing state assessment in various aspects for the apparatus 800. For example, the sensor assembly 814 may detect an on/off state of the apparatus 800, and relative positioning of assemblies, which are the display and keypad of the apparatus 800, for example, and the sensor assembly 814 may further detect a position change of the apparatus 800 or a assembly of the apparatus 800, the presence or absence of contact of the user with the apparatus 800, the orientation or acceleration/deceleration of the apparatus 800, and a temperature change of the apparatus 800. The sensor assembly 814 may include a proximity sensor which is configured to detect the presence of a nearby object when there is no physical contact. The sensor assembly 814 may further include a light sensor, such as a CMOS or CCD image sensor, for use in an imaging application. In some embodiments, the sensor assembly 814 may further include an acceleration sensor, a gyroscope sensor, a magnetic sensor, a pressure sensor, or a temperature sensor.

The communication assembly 816 is configured to facilitate wired or wireless communications between the apparatus 800 and other devices. The apparatus 800 may access a wireless network based on a communication standard, such as WiFi, 2G, or 3G, or a combination thereof. In an exemplary embodiment, the communication assembly 816 receives a broadcast signal or broadcast-related information from an external broadcast management system by means of a broadcast channel. In an exemplary embodiment, the communication assembly 816 further includes a Near Field Communication (NFC) module to facilitate short range communication. For example, the NFC module may be implemented based on Radio Frequency Identification (RFID) technology, Infrared Data Association (IrDA) technology, Ultra-Wideband (UWB) technology, Bluetooth (BT) technology, and other technologies.

In an exemplary embodiment, the apparatus 800 may be implemented by one or more Application-Specific Integrated Circuits (ASICs), Digital Signal Processors (DSPs), Digital Signal Processing Devices (DSPDs), Programmable Logic Devices (PLDs), Field-Programmable Gate Arrays (FPGAs), controllers, microcontrollers, microprocessors, or other electronic elements, to execute the method above. In an exemplary embodiment, a non-volatile computer-readable storage medium is further provided, for example, a memory 804 including computer program instructions, which can be executed by the processor 820 of the apparatus 800 to implement the method above.

The embodiments of this disclosure may be systems, methods, and/or computer program products. The computer program product may include a computer-readable storage medium having computer-readable program instructions thereon for causing a processor to carry out aspects of this disclosure. The computer-readable storage medium may be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. More specific examples (a non-exhaustive list) of the computer-readable storage medium include: a portable computer diskette, a hard disk, a Random Access Memory (RAM), an ROM, an Erasable Programmable Read-Only Memory (EPROM or Flash memory), a SRAM, a portable Compact Disk Read-Only Memory (CD-ROM), a Digital Versatile Disc (DVD), a memory stick, a floppy disk, a mechanically encoded device such as punch-cards or raised structure in a groove having instructions stored thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a Local Area Network (LAN), a wide area network and/or a wireless network. The network may include copper transmission cables, optical fiber transmission, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the embodiments of this disclosure may be assembler instructions, Instruction-Set-Architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may be executed entirely on the user's computer, partly on the user's computer, as a stand-alone software package, partly on the user's computer and partly on a remote computer or entirely on the remote computer or server. In a scenario involving a remote computer, the remote computer may be connected to the user's computer through any type of network, including a LAN or a Wide Area Network (WAN), or the connection may be made to an external computer (for example, through the Internet using an Internet service provider). In some embodiments, electronic circuitry including, for example, programmable logic circuitry, FPGAs, or Programmable Logic Arrays (PLAs) may execute the computer-readable program instructions by utilizing state information of the computer-readable program instructions to personalize the electronic circuitry, in order to implement aspects of the embodiments of this disclosure.

Aspects of the embodiments of this disclosure are described herein with reference to flowcharts and/or block diagrams of methods, apparatuses (systems), and computer program products according to the embodiments of this disclosure. It should be understood that each block of the flowcharts and/or block diagrams, and combinations of blocks in the flowcharts and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable medium having instructions stored therein includes an article of manufacture instructing instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus or other device implement the functions/acts specified in the flowchart and/or block diagram block or blocks.

The flowchart and block diagrams in the drawings illustrate the architecture, functionality and operation of possible implementations of systems, methods, and computer program products according to multiple embodiments of the embodiments of this disclosure. In this regard, each block in the flowchart of block diagrams may represent a module, segment, or portion of instruction, which includes one or more executable instructions for implementing the specified logical function(s). In some alternative implementations, the functions noted in the block may occur out of the order noted in the drawings. For example, two blocks shown in succession may, in fact, be executed substantially concurrently, or the blocks may sometimes be executed in the reverse order, depending upon the functionality involved. It should also be noted that each block of the block diagrams and/or flowcharts, and combinations of blocks in the block diagrams and/or flowcharts, can be implemented by special purpose hardware-based systems that perform the specified functions or acts or carried out by combinations of special purpose hardware and computer instructions.

The descriptions of the various embodiments of this disclosure have been presented for purposes of illustration, but are not intended to be exhaustive or limited to the embodiments disclosed. Many modifications and variations will be apparent to persons of ordinary skill in the art without departing from the scope and spirit of the described embodiments. The terminology used herein was chosen to best explain the principles of the embodiments, the practical application or technical improvements over technologies available in the marketplace, or to enable other persons of ordinary skill in the art to understand the embodiments disclosed herein.

The invention claimed is:

1. A method for detecting a living body, comprising:
acquiring depth information of a target object sensed by a first sensor and a target image sensed by a second sensor;
aligning the depth information of the target object with the target image according to a parameter of the first sensor and a parameter of the second sensor;
performing key point detection on the target image to obtain key point information of the target object; and
obtaining a living body detection result of the target object by processing the depth information of the target object and the key point information of the target object through a neural network.

2. The method according to claim 1, wherein the first sensor is a Time of Flight (ToF) sensor or a structured light sensor, and the second sensor is an RGB (Red, Green, and Blue) sensor or a near-infrared sensor.

3. The method according to claim 1, wherein the operation of obtaining a living body detection result of the target object by processing the depth information of the target object and the key point information of the target object through a neural network comprises:
obtaining first feature information by processing the depth information of the target object and the key point information of the target object through the neural network;
obtaining second feature information by processing the key point information of the target object through the neural network; and
determining a living body detection result of the target object based on the first feature information and the second feature information.

4. The method according to claim 3, wherein the neural network comprises a first neural network and a second neural network, and the obtaining first feature information by processing the depth information of the target object and the key point information of the target object through the neural network comprises:
inputting the depth information of the target object and the key point information of the target object into the first neural network for processing to obtain first feature information;
the obtaining second feature information by processing the key point information of the target object through the neural network comprises:
inputting the target image and the key point information of the target object into the second neural network for processing to obtain second feature information.

5. The method according to claim 3, wherein the obtaining first feature information by processing the depth information of the target object and the key point information of the target object through the neural network comprises:
convoluting the depth information of the target object and the key point information of the target object to obtain a first convolution result;
down-sampling the first convolution result to obtain a first down-sampling result; and
obtaining first feature information based on the first down-sampling result.

6. The method according to claim 3, wherein the obtaining second feature information by processing the key point information of the target object through the neural network comprises:
convoluting the target image and the key point information of the target object to obtain a second convolution result;
down-sampling the second convolution result to obtain a second down-sampling result; and
obtaining second feature information based on the second down-sampling result.

7. The method according to claim 3, wherein the determining a living body detection result of the target object based on the first feature information and the second feature information comprises:
performing fusion processing on the first feature information and the second feature information to obtain third feature information; and
determining a living body detection result of the target object according to the third feature information.

8. The method according to claim 7, wherein the determining a living body detection result according to the third feature information comprises:

obtaining a probability that the target object is a living body based on the third feature information; and
determining a living body detection result of the target object according to the probability that the target object is a living body.

9. An apparatus for detecting a living body, comprising:
a processor; and
memory for storing instructions executable by the processor;
wherein execution of the instructions by the processor causes the processor to perform:
acquiring depth information of a target object sensed by a first sensor and a target image sensed by a second sensor;
aligning the depth information of the target object with the target image according to a parameter of the first sensor and a parameter of the second sensor;
performing key point detection on the target image to obtain key point information of the target object; and
obtaining a living body detection result of the target object by processing the depth information of the target object and the key point information of the target object through a neural network.

10. The apparatus according to claim 9, wherein the first sensor is a Time of Flight (ToF) sensor or a structured light sensor, and the second sensor is an RGB (Red, Green, and Blue) sensor or a near-infrared sensor.

11. The apparatus according to claim 9, wherein the obtaining a living body detection result of the target object by processing the depth information of the target object and the key point information of the target object through a neural network comprises:
obtaining first feature information by processing the depth information of the target object and the key point information of the target object through the neural network;
obtaining second feature information by processing the key point information of the target object through the neural network; and
determining a living body detection result of the target object based on the first feature information and the second feature information.

12. The apparatus according to claim 11, wherein the neural network comprises a first neural network and a second neural network, and the obtaining first feature information by processing the depth information of the target object and the key point information of the target object through the neural network comprises:
inputting the depth information of the target object and the key point information of the target object into the first neural network for processing to obtain first feature information; and
the obtaining second feature information by processing the key point information of the target object through the neural network comprises:
inputting the target image and the key point information of the target object into the second neural network for processing to obtain second feature information.

13. The apparatus according to claim 11, wherein the obtaining first feature information by processing the depth information of the target object and the key point information of the target object through the neural network comprises:
convoluting the depth information of the target object and the key point information of the target object to obtain a first convolution result;

down-sampling the first convolution result to obtain a first down-sampling result; and obtaining first feature information based on the first down-sampling result.

14. The apparatus according to claim 11, wherein the obtaining second feature information by processing the key point information of the target object through the neural network comprises:

convoluting the target image and the key point information of the target object to obtain a second convolution result;

down-sampling the second convolution result to obtain a second down-sampling result; and obtaining second feature information based on the second down-sampling result.

15. The apparatus according to claim 11, wherein the determining a living body detection result of the target object based on the first feature information and the second feature information comprises:

performing fusion processing on the first feature information and the second feature information to obtain third feature information; and determining a living body detection result of the target object according to the third feature information.

16. The apparatus according to claim 15, wherein the determining a living body detection result according to the third feature information comprises:

obtaining a probability that the target object is a living body based on the third feature information; and determining a living body detection result of the target object according to the probability that the target object is a living body.

17. A non-transitory computer-readable storage medium, having computer program instructions stored thereon, wherein execution of the instructions by the processor causes the processor to implement the method according to claim 1.

18. An electronic device, comprising:

a first sensor, configured to detect depth information of a target object;

a second sensor, configured to collect a target image comprising the target object; and a processor, configured to align the depth information of the target object with the target image according to a parameter of the first sensor and a parameter of the second sensor, perform key point detection on the target image collected by the second sensor to obtain key point information of the target object, and obtain a living body detection result of the target object by processing the depth information of the target object detected by the first sensor and the key point information of the target object through a neural network.

* * * * *